United States Patent [19]

Cornelison et al.

[11] Patent Number: 4,786,137
[45] Date of Patent: Nov. 22, 1988

[54] OPTICAL CABLE WITH FILLING COMPOUND AND PARALLEL FIBERS

[75] Inventors: Kenneth E. Cornelison, Overland Park; Michael E. McGuire, Shawnee Mission, both of Kans.

[73] Assignee: Ericsson, Inc., Overland Park, Kans.

[21] Appl. No.: 687,601

[22] Filed: Dec. 31, 1984

[51] Int. Cl.⁴ ............................................. G02B 6/44
[52] U.S. Cl. ................................................. 350/96.23
[58] Field of Search ........................... 350/96.23, 96.24

[56] References Cited

U.S. PATENT DOCUMENTS

| | | | |
|---|---|---|---|
| 4,072,398 | 2/1978 | Larsen et al. | 350/96.23 |
| 4,230,395 | 10/1980 | Dean et al. | 350/96.23 |
| 4,272,155 | 6/1981 | Slaughter | 350/96.23 |
| 4,312,566 | 1/1982 | Jackson | 350/96.23 |
| 4,370,023 | 1/1983 | Lange et al. | 350/96.23 |
| 4,372,792 | 2/1983 | Dey et al. | 350/96.23 |
| 4,375,313 | 3/1983 | Anderson et al. | 350/96.23 |
| 4,401,366 | 8/1983 | Hope | 350/96.23 |

FOREIGN PATENT DOCUMENTS 2429670  6/1974  Fed. Rep. of Germany ... 350/96.23

Primary Examiner—William L. Sikes
Assistant Examiner—Robert E. Wise
Attorney, Agent, or Firm—Burns, Doane, Swecker & Mathis

[57] ABSTRACT

Single mode optical fiber cable with a plurality of buffer tubes wherein the buffer tubes each encase a plurality of single mode optical fibers, the fibers run in a random pattern through the buffer tube and the remaining space is filled with soft filler material which prevents the ingress of moisture while allowing free movement of the fibers within the tube, the fibers all having equal overlength.

3 Claims, 4 Drawing Sheets

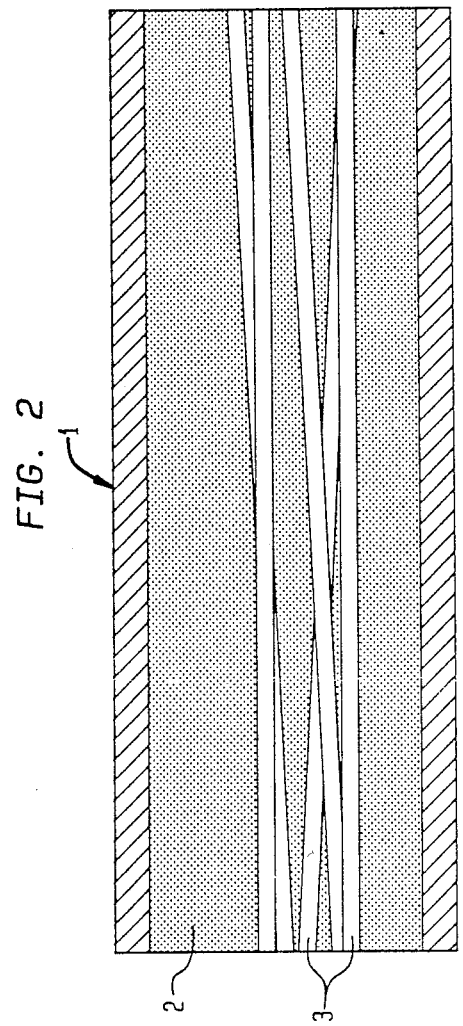
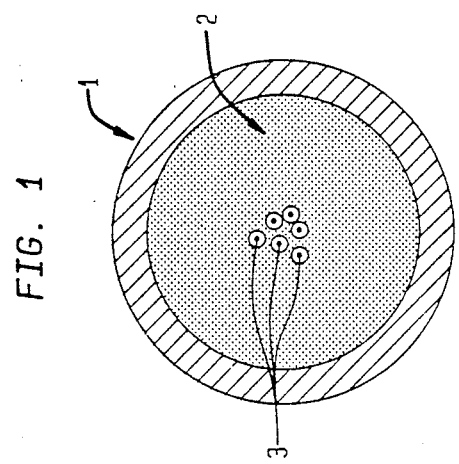
FIG. 2
FIG. 1

OPTICAL CABLE WITH FILLING COMPOUND AND PARALLEL FIBERS

BACKGROUND OF THE INVENTION

1. Field of the Invention

The invention relates to optical fiber transmission cables and in particular to a new optical fiber cable and method and apparatus for making it.

2. Background Information

Optical fiber cables for transmission signals are known in the art. An optical fiber cable may be made up of a plurality of optical fibers housed within a sheath. An optical fiber is an elongated element of narrow diameter and great or indefinite length. The optical fiber is formed of glass or synthetic material and comprises a core of predetermined refractive index and a covering of smaller refractive index.

Use of optical fibers entails some difficulties, in that, large numbers of fibers must be contained in a single cable. The fibers must be placed in the cable such that each fiber is free from excessive mechanical stress which causes microbending in the fiber and a resultant increase in attenuation.

A preferred fiber optic cable utilizes fibers which propagate only one mode of light compared with multimode fibers which propagate several modes along the fiber core. Present single mode fibers are more sensitive to microbending losses, particularly at the longer wavelengths used in today's systems than multimode fibers previously used for telecommunications. The single mode fibers have inherent attenuation that is only a fraction of that in multimode fibers available a few years ago. Typically, telecommunication grade single mode fibers have an attenuation of 0.3 to 0.5 db/km at 1300 nm wavelengths as compared to multimode fibers which have attenuations of 3 to 4 db/km. Microbending can cause increased losses at this wavelength in the order of 0.1 to 0.3 db/km. Therefore any additional attenuation due to microbending is much more significant with single mode fibers. Additionally, new transmission systems operate at 1550 nm on single mode fibers. Microbending at this wavelength can be in the order of 0.1 to 3.0 db/km which essentially could make the cable unusable for transmission at this wavelength. Therefore, reduced levels of stress and microbend induced attenuation are necessary for single mode cable designs.

In order to limit the attenuation various types of cables have been developed. U.S. Pat. No. 4,153,332 to Longoni discloses an optical fiber cable wherein a group of tightly bundled optical fibers are housed within a tube and a plurality of those tubes are wound or stranded to produce a cable when covered by an outer sheath. This cable, however, is susceptible to water damage caused by water entering through a leak in the sheath and running along the interior space of the cable sheath and the tubes. Moreover, the fibers in the '332 cable are of unequal overall length. This is because the effective diameter of the cable coils differs depending on fiber location. That is, when the fibers are in a bundle, the fibers innermost in the coil travel a loop of smaller radius than do the fibers outermost in the coil.

U.S. Pat. No. 4,331,379 to Oestreich et al. provides for filling the space within the cable between a stranded fiber bundle and the inner cable wall with a soft filler. The filler improves the prevention of moisture ingress in the cable. However, the stranded inner bundle of optical fibers increases the bending stresses in the fibers and therefore increases the attenuation.

In manufacture, the stranded bundle is easier to handle, however, more machinery, and therefore increased cost is necessary to strand the fibers. If parallel fibers are used, they are often difficult to handle and the fibers may end up with widely divergent lengths and therefore inconsistent transmission quality.

SUMMARY OF THE INVENTION

The invention relates to an optical fiber buffering tube which employs two or more coated single mode optical fibers located in a single oversized buffer tube. The fibers are laid substantially parallel with the axis of the tube and each other. The tube is simultaneously filled with a soft thixotropic gel or thickened oil. The gel or oil prevents the ingress of moisture into the tube while allowing the fibers to move freely and independently of each other. The tube is made of hard plastic material which provides structural strength and protection to the fibers.

The generally parallel arrangement of the fibers results in lower bending stresses than if the fibers were stranded into a bundle within the tube. The filling material provides a freedom of movement of the fibers within the tube so that the fibers remain relatively free of any net compression or tensile stress during elongation, contraction or bending of the tube. By providing that the fibers are of substantially equal length, the fibers are caused to react similarly to a bend in the tube. That is, the fibers take a position which causes the least stress and therefore the least attenuation.

The apparatus and method of the invention provide for the manufacture of the buffer tube with generally parallel fibers of equal length disposed within it. The insertion of the fibers is accomplished by means of a series of payoff bobbins and a controlling capstan. The controlling capstan regulates the overlength of the fibers within the tube such that each fiber has the same overlength. The rotational speed of the capstan is dependent upon the linear speed of the tube and controlled by a control unit.

A feature of the apparatus is its provision for a guide mechanism to prevent overlapping the fibers. This feature and the precise tolerances of the capstan provide for uniform overlength of the fibers by preventing overlapping of the fibers on the capstan which causes differences in overlength for the inner and outer fibers.

The fiber payoffs or bobbins are designed to provide uniform tension in the various fibers. Unequal tension would create non-uniform elongation and therefore unequal fiber overlength in the buffer tube.

The optical fibers are grouped in a random pattern by funnel-like means and fed into an extrusion aparatus.

The buffer tube is extruded by the extrusion apparatus around the optical fibers, with sufficient space to allow the fibers to move freely. The apparatus also fills the buffer tube with a protective filler.

Several buffer tubes may be stranded together with a back twist around a central support member which provides compression and tensile strength. The stranding of the buffer tubes provides essentially equal path lengths for each of the fibers, regardless of their relative position within the tube. The helix formed by the stranded tube provides an elongation quality to the cable without stressing the fibers.

BRIEF DESCRIPTION OF THE DRAWINGS

The invention will be described with reference to the drawings wherein:

FIG. 1 is a transverse cross-sectional view of the buffer tube assembly of the invention;

FIG. 2 is a longitudinal cross-section of the buffer tube assembly;

DESCRIPTION OF THE PREFERRED EMBODIMENT

The description is given with reference to the drawings. The same or similar numbers are used to denote the same or similar items throughout the Figure.

The buffer tube depicted in FIGS. 1 and 2 is comprised of an outer covering 1 which is filled with a filling material 2, such as thixotropic filling compound. The filling material has a consistency softer than the material of the outer covering and the optical fibers disposed within the outer covering. As illustrated, at least two coated single mode optical fibers 3 which are loosely spaced with respect to each other. The loose spacing of the fibers assures that the fibers move freely and maintain their uniform length. The internal cross-sectional area of outer covering 1 is larger than the cross-sectional area of the fibers; this allows the fibers room to move within the outer covering of the buffer tube.

The fibers are placed in the outer covering with an overlength. That is, each fiber has a length which is incrementally greater than the length of the outer covering of the buffer tube which encases it. This requires the fiber to follow a wavey path within the outer covering as long as the outer covering is straight. Once one or more buffer tubes are stranded into a cable, the overlength causes the fibers to follow the general shape of the outer covering of each buffer tube.

Figure 3:
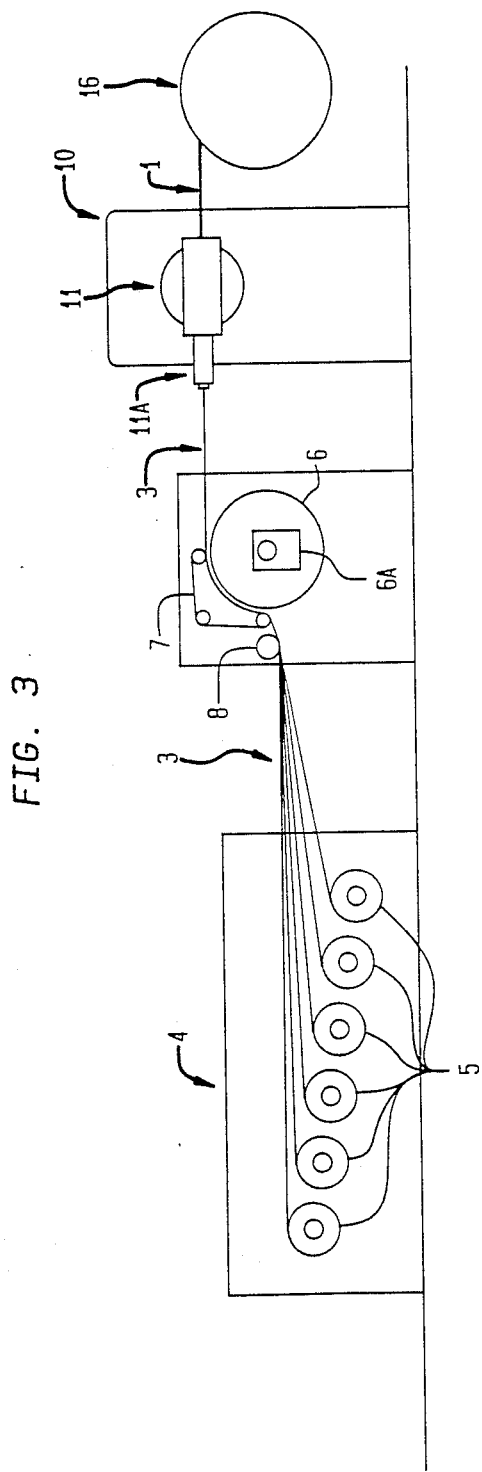
FIG. 3 is a side elevational view of the apparatus of the invention.

FIG. 3 depicts the apparatus for manufacturing the buffer tube. The payoff stand 4 holds a plurality of payoff reels 5 which provide equal and consistent tension to the optical fibers. Consistent tension is necessary to provide the fibers with equal elongation so that the uniform overall length may be maintained. The fibers 3 pass between a capstan 6 and a mechanism for biasing the fibers against the capstan 6. In this embodiment the mechanism is a belt 7. This biasing mechanism causes friction between the fibers 3 and the capstan 6. This assures that all the fibers 3 and the capstan 6 are traveling at uniform speed.

Figure 4A:
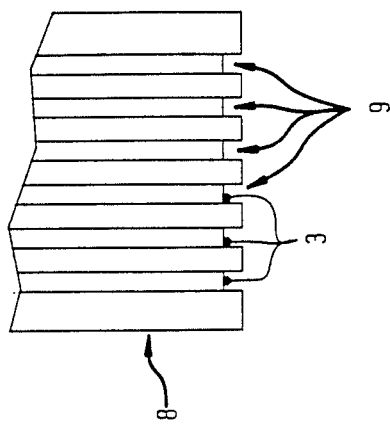
FIG. 4A is an enlarged view of a portion of the guidewheel.
Figure 4:
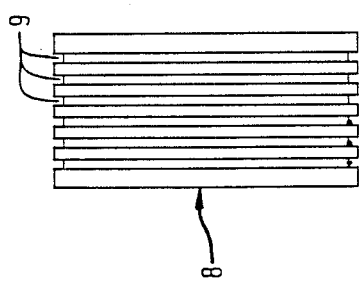
FIG. 4 is a front view of the guidewheel of the apparatus of the invention.

An important feature of the device is the guidewheel 8. The guidewheel 8 keeps the fibers sufficiently separated so that overlapping of the fibers 3 does not occur along their path lengths. The configuration of this wheel is best shown in FIGS. 4 and 4A. The guiding devices comprises a series of grooves 9 which receive the fibers 3 and separate them in a horizontal plane. This separation prevents the fibers from bunching on the capstan 6 by putting them in a parallel but separated relationship.

An extruder 10 (FIG. 3), which has a basic construction known to those skilled in the art, is used to process resin to form the outer covering of the buffer tube. A crosshead 11 allows both injection of the filling material 2 and the disposition of the optical fibers 3 within the extruded outer covering of the buffer tube. The fibers are gathered into a random pattern by funnel-like means 11A and carried through the extruder. During this operation, the fibers are carried by the viscous filling material. The speed of the capstan 6 is dependent upon the speed of the buffer tube 1 issuing from the crosshead 11 and is controlled by control means 6A. This assures uniformity of overlength of each fiber along the length of the buffer tube assembly.

Figure 5:
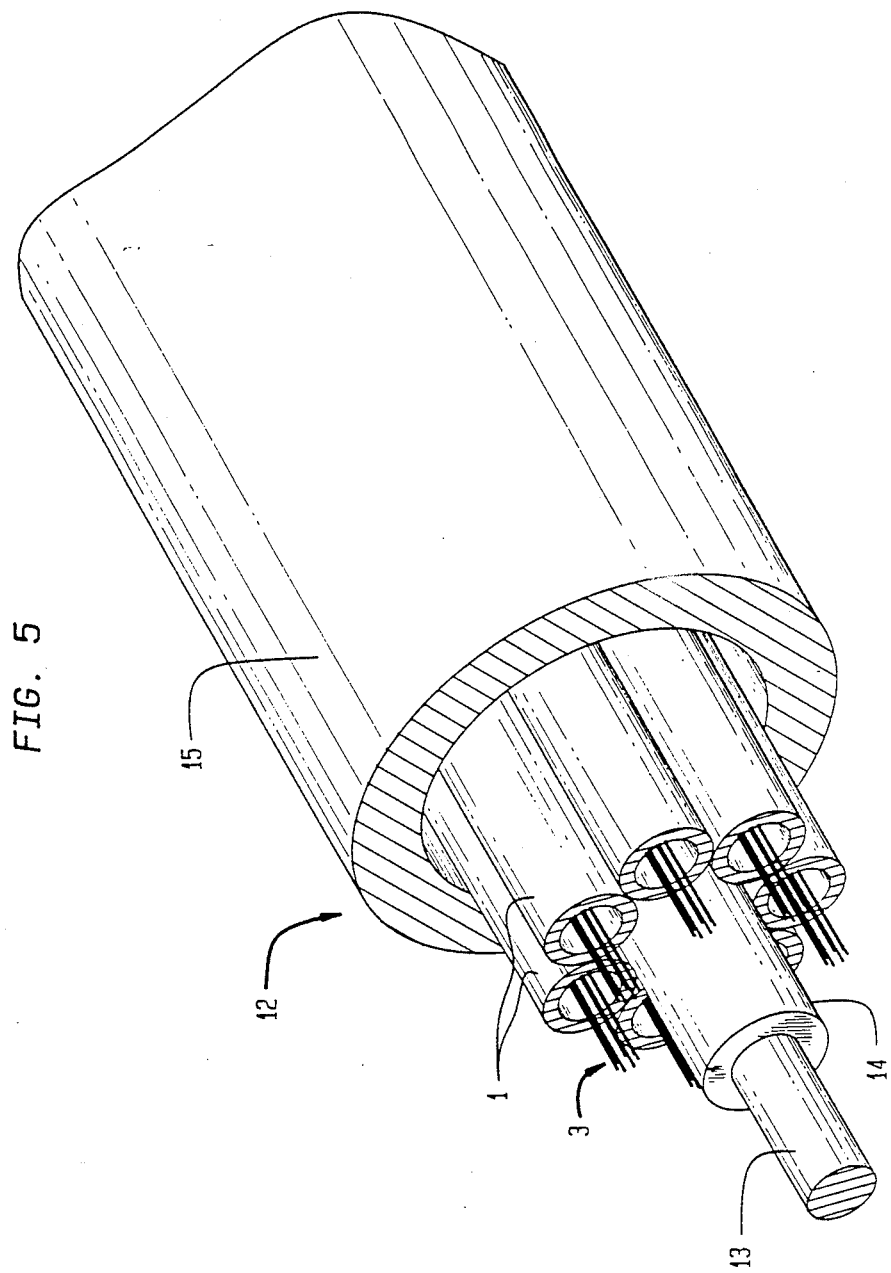
FIG. 5 is a view of the completed cable assembly.

The buffer tube may then be gathered onto a spool 16 or stranded into a cable 12 shown in FIG. 5. A strength member 13 provides axial compression and axial tensile strength. The coating 14 provides protection by buffering the contact between strength member 13 and the outer covering of each of a plurality of buffer tubes. The coating 14 also provides sufficient circumferential space for the proper placement of the buffer tubes, depending on the number of buffer tubes stranded about the strength member 13. The buffer tubes which contain the fibers 3 are stranded with a finite pitch which results in additional elongation and contraction capability for the assembly. These additional capabilities are provided without inducing additional stress in the fibers 3. The stranding also provides equal path lengths of the buffer tubes regardless of their position within the assembled cable 12 which reduces fiber bending stress. The interstices between the buffer tubes may or may not be filled with a material to prevent the ingress of moisture. A sheath 15 is applied to the cable assembly 12 to provide extra protection.

We claim:

1. An optical fiber transmission cable assembly for grouping optical fibers comprising at least one buffer tube, at least two optical fibers within each said buffer tube capable of transmission of light in a single mode especially in wavelength regions longer than 1300 nm, said optical fibers within each said buffer tube having substantially the same overlength and each said buffer tube having an inner dimension larger than an area occupied by said optical fibers, a filler material within each said buffer tube, said filler material having a consistency softer than the material of each said buffer tube and optical fibers, said optical fibers supported by said filler material within each said buffer tube in a random, substantially parallel arrangement one to another and in a manner that each optical fiber is capable of movement both freely and independently while relatively free of net compression or tensile stress under potential cable operating conditions, and a central strengthening member, each said buffer tube strand about said central strengthening member at a predetermined pitch, said arrangement of optical fibers supported by said filler material each with substantially the same overlength being rendered less subject to mechanical stress to enhance operation of said cable in said wavelength regions.

2. The optical fiber cable according to claim 1 wherein the filler material is thixotropic gel.

3. The cable assembly according to claim 1, further including a sheath enclosing said stranded buffer tubes to form a unitary cable.

* * * * *